(12) United States Patent
Thangappan

(10) Patent No.: US 9,195,780 B2
(45) Date of Patent: Nov. 24, 2015

(54) COMPUTER USER INTERFACE INCLUDING A DATA GRID WITH A PERSISTENT DISPLAY PORTION

(75) Inventor: Darwin Thangappan, Tamilnadu (IN)

(73) Assignee: Oracle International Corporation, Redwood Shores, CA (US)

( * ) Notice: Subject to any disclaimer, the term of this patent is extended or adjusted under 35 U.S.C. 154(b) by 529 days.

(21) Appl. No.: 13/480,015

(22) Filed: May 24, 2012

(65) Prior Publication Data

US 2013/0086464 A1  Apr. 4, 2013

Related U.S. Application Data

(60) Provisional application No. 61/541,895, filed on Sep. 30, 2011.

(51) Int. Cl.
*G06F 17/00* (2006.01)
*G06F 17/30* (2006.01)

(52) U.S. Cl.
CPC .... *G06F 17/30994* (2013.01); *G06F 17/30905* (2013.01)

(58) Field of Classification Search
CPC ............... G06F 17/30905; G06F 17/30994
USPC ................................ 715/212, 227
See application file for complete search history.

(56) References Cited

U.S. PATENT DOCUMENTS

| | | | |
|---|---|---|---|
| 7,155,667 B1* | 12/2006 | Kotler et al. | 715/210 |
| 7,506,243 B2* | 3/2009 | Kotler et al. | 715/220 |
| 2004/0103369 A1* | 5/2004 | Robertson et al. | 715/509 |
| 2008/0082938 A1* | 4/2008 | Buczek | 715/784 |
| 2010/0083082 A1* | 4/2010 | Lehrian et al. | 715/212 |
| 2010/0268773 A1* | 10/2010 | Hunt et al. | 709/203 |
| 2010/0269031 A1* | 10/2010 | Buczek | 715/217 |
| 2011/0307772 A1* | 12/2011 | Lloyd et al. | 715/212 |

OTHER PUBLICATIONS

Freeze or Lock Rows and Columns obtained at http://office.microsoft.com/en-us/excel-help/freeze-or-lock-rows-and-columns-HP001217048.aspx; May 1, 2012; 2 pages.

(Continued)

*Primary Examiner* — Stephen Hong
*Assistant Examiner* — Marshon Robinson
(74) *Attorney, Agent, or Firm* — Trellis IP Law Group, PC

(57) ABSTRACT

A system and method for facilitating displaying data in a table via a web-based data grid. The example method includes rendering a first table and then rendering a second table via a layer overlaid on the first table. The second table replicates a user selected portion of the first table. In a specific embodiment, the example method further includes providing a first user option to horizontally scroll the first table. One or more columns of the second table remain static in response to horizontal scrolling of the first table. A second user option enables vertical scrolling of the first table. Vertical scrolling of the first table causes concurrent vertical scrolling of the second table. A third user option enables repositioning of the second table relative to the first table. The first table and overlaid second table, called the frozen section, may be implemented via client-side scripting.

20 Claims, 8 Drawing Sheets

(56) References Cited

OTHER PUBLICATIONS

How to Freeze Columns Using Javascript and HTML; obtained at www.massless.org/_tests/grid1/?s=0&r=40&c=40; May 17, 2012; 1 page.

Freeze Panes HTML Table Like Excell in a Scrollable Div—Demo 2; obtained at http://coastworx.com/freezepains_table.html; May 17, 2012; 1 page.

* cited by examiner

| Records 1-10 | | | | | | | | | | | |
|---|---|---|---|---|---|---|---|---|---|---|---|
| Order Num. | Or Ty | Order Co | Line Num. | Hd Cd | Sold To | Sold To Name | Quantity | Description 1 | UOM | Extended Amount | Ship To | Last Status |
| 3 | SO | 0001 | 1,000 | | 56039 | Taiwan Cust. | 1,000 | Mtn. Bike, Brwn. | EA | 798,000 | 56039 | 580 |
| 3 | SO | 0001 | 2,000 | | 56039 | Taiwan Cust. | 1,000 | Test | EA | 20,000 | 56039 | 580 |
| 4 | SO | 0077 | 1,000 | | 4245 | Cloud, Inc. | 10,000 | Mtn. Bike, Brwn. | EA | 88,000 | 4245 | 520 |
| 5 | SO | 0077 | 1,000 | | 4245 | Cloud, Inc. | 8,000 | Mtn. Bike, Brwn. | EA | 1,066 | 4245 | 580 |
| 5 | SO | 0077 | 2,000 | | 4245 | Cloud, Inc. | 9,000 | Mtn. Bike, Brwn. | EA | 1,200 | 4245 | 580 |
| 13 | SO | 0001 | 1,000 | | 4245 | ABC Const. | 10,000 | Velo Mont. | EA | 11,970 | 4242 | 620 |
| 13 | SO | 0011 | 2,000 | | 4245 | ABC Const. | 5,000 | Velo Tourisme | EA | 3,250 | 4242 | 620 |

FIG. 2

Records 1-10

| Order Num. | Or Ty | Order Co | Line Num. | Hd Cd | Sold To | Description 1 | UOM | Extended Amount | Ship To | Last Status | Next Status | Customer PO |
|---|---|---|---|---|---|---|---|---|---|---|---|---|
| 3 | SO | 0001 | 1.000 | | 5603 | Mtn. Bike, Brwn. | EA | 798.000 | 56039 | 580 | 999 | |
| 3 | SO | 0001 | 2.000 | | 5603 | Test | EA | 20.000 | 56039 | 580 | 999 | |
| 4 | SO | 0077 | 1.000 | | 4245 | Mtn. Bike, Brwn. | EA | 88.000 | 4245 | 520 | 540 | |
| 5 | SO | 0077 | 1.000 | | 4245 | Mtn. Bike, Brwn. | EA | 1.066 | 4245 | 580 | 620 | |
| 5 | SO | 0077 | 2.000 | | 4245 | Mtn. Bike, Brwn. | EA | 1.200 | 4245 | 580 | 620 | |
| 13 | SO | 0001 | 1.000 | | 4245 | Velo Mont. | EA | 11.970 | 4242 | 620 | 999 | |
| 13 | SO | 0011 | 2.000 | | 4245 | Velo Tourisme | EA | 3.250 | 4242 | 620 | 999 | |

COMPUTER USER INTERFACE INCLUDING A DATA GRID WITH A PERSISTENT DISPLAY PORTION

CROSS REFERENCES TO RELATED APPLICATIONS

This application claims priority from U.S. Provisional Patent Application Ser. No. 61/541,895, entitled COMPUTER USER INTERFACE INCLUDING A DATA GRID WITH A PERSISTENT DISPLAY PORTION, filed on Sep. 30, 2011, which is hereby incorporated by reference as if set forth in full in this application for all purposes.

COPYRIGHT DISCLAIMER

This application includes computer source code by which particular embodiments of the invention may be practiced. Applicant has no objection to the facsimile reproduction of the source code for purposes of this application, but otherwise retains all rights. Note that the source code may include third party works or other works not owned by the Applicant. Applicant makes no claim to such third party or other works.

BACKGROUND

The present application relates to software and more specifically to software and accompanying graphical user interfaces for facilitating viewing data in tables presented via webpages.

Tables, also called data grids, are employed in various demanding applications, including spreadsheets, databases, enterprise network pages, and webpages. Such applications often demand feature rich tables and accompanying user interface controls for adjusting how data is displayed in the tables.

Conventionally, webpages use one or more markup languages, such as HyperText Markup Language (HTML) to specify table views. Scripting languages, such as JavaScript, may facilitate adding user interface controls, such as Query By Example (QBE) elements and scroll bars, to a table to facilitate adjusting or otherwise scrolling data displayed in a table of a webpage, called a web-based table.

However, conventional HTML and scripting techniques have provided limited functionality for adjusting table views. Consequently, certain features that users have become accustomed to in spreadsheet and database applications are typically unavailable in web-based tables. Hence, an increasing need remains for techniques than can further augment functionality of web-based tables.

SUMMARY

An example method facilitates displaying data in a table, called a data grid, of a webpage. The example method includes rendering a first table and then rendering a second table via a layer overlaid on the first table, wherein the second table replicates a user selected portion of the first table.

In a specific embodiment, the example method further includes providing a first user option to horizontally scroll the first table, wherein one or more columns of the second table remain static in response to horizontal scrolling of the first table. A second user option enables vertical scrolling of the first table, wherein vertical scrolling of the first table causes concurrent vertical scrolling of the second table. In an illustrative embodiment, a third user option enables repositioning of the second table relative to the first table.

In the specific embodiment, the second table represents a user selected frozen section of the first table, wherein data contained in the second table remains frozen in response to horizontal scrolling of the first table. The method further includes employing JavaScript computer code to generate the first table and the frozen section, wherein the JavaScript has been transferred from a server to a client for execution by a browser running on the client.

The example method further includes employing one or more HyperText Markup Language (HTML) DIV tags to encapsulate the first table in a first Document Object Model (DOM) structure. HTML DIV tags are also employed to encapsulate the frozen section in the DOM structure, resulting in an encapsulated frozen section with a higher z-index than the first table. The encapsulated frozen section includes a similar table structure as the first table, except that a number of vertical columns of the frozen section remains fixed and determined by user selection of an area of the first table to be frozen.

The example method further includes redrawing the frozen section in response to a vertical scroll operation. In response to a downward scroll operation, one or more rows from a top portion of the frozen section are deleted, while one or more rows to a bottom portion of the frozen section are added. Similarly, in response to an upward scroll operation, one or more rows from a top portion of the frozen section are added, while one or more rows are deleted from a bottom portion of the frozen section.

Hence, certain embodiments discussed herein facilitate augmenting web-based tables or data grids with freeze functionality, thereby enabling users to select a portion of a table display to remain fixed during horizontal scrolling. Such functionality may facilitate viewing and comprehending data displayed in web-based tables.

BRIEF DESCRIPTION OF THE DRAWINGS

FIG. 2 is a diagram illustrating a first example table with a highlighted frozen section before scrolling.

FIG. 3 is a diagram illustrating the example table of FIG. 2 after an example horizontal scroll operation.

FIG. 5 is a diagram illustrating the example table of FIG. 4, wherein the frozen section has been displaced from its original position.

DETAILED DESCRIPTION OF EMBODIMENTS

Figure 1:
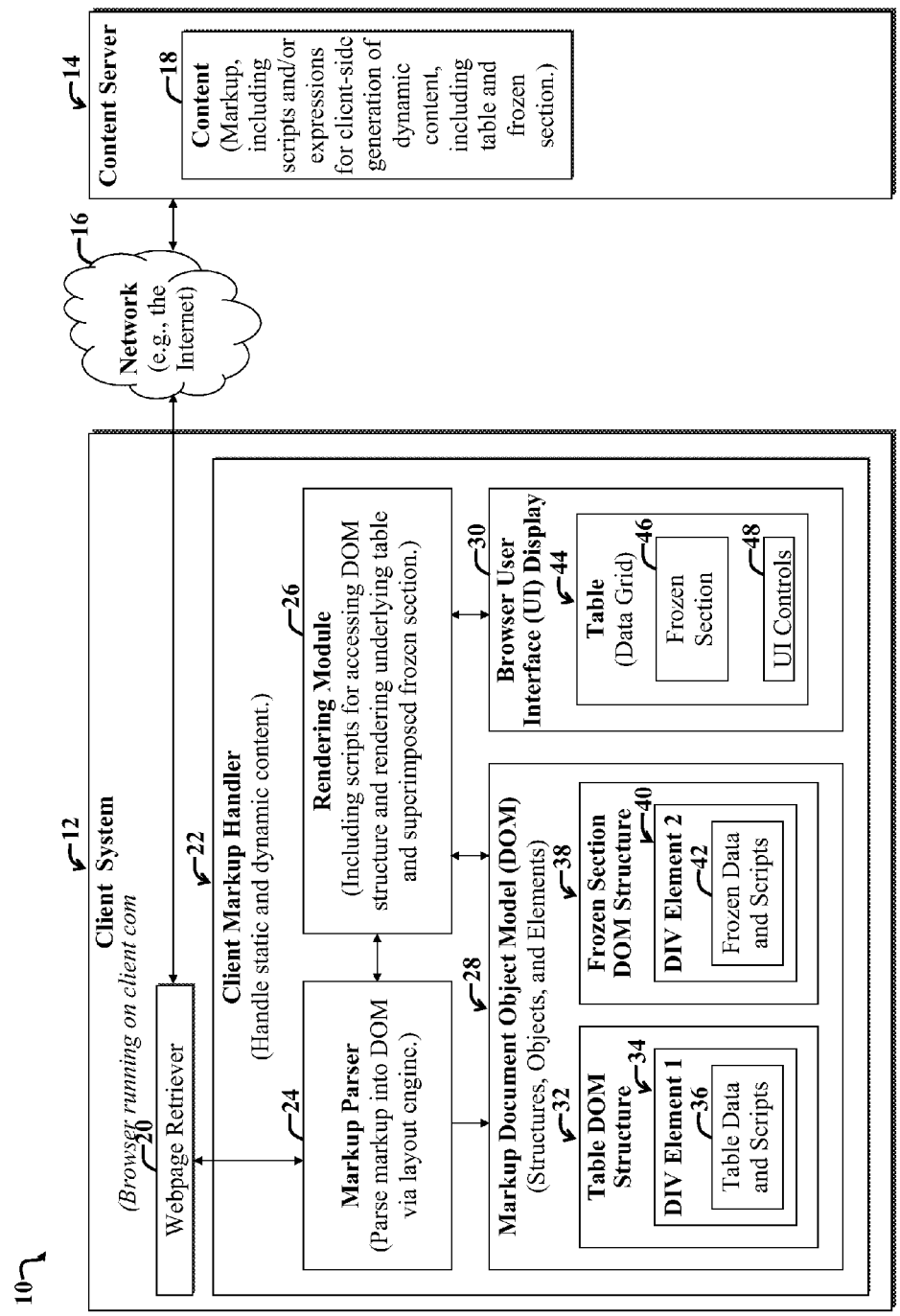
FIG. 1 is a diagram illustrating a first example system for accessing and displaying data in a web-based table with freeze functionality.

Although the description has been described with respect to particular embodiments thereof, these particular embodiments are merely illustrative, and not restrictive.

For example, while the present description is discussed with respect to providing freeze functionality with respect to horizontal scrolling operations in web-based tables via execution of client-side JavaScripts, embodiments are not limited thereto. For example, freeze functionality may be provided for vertical table scrolling operations in addition to or instead of freeze functionality for horizontal table scrolling. In addition, scripts implemented via scripting languages other than JavaScript (e.g., JScript, ECMAScript, VBScript, Java, and so on) may be employed to dynamically generate tables or data grids with freeze functionality as discussed herein. Furthermore, embodiments may be adapted for use with other network-based pages, e.g., other than HTML-based webpages, without departing from the scope of the present teachings.

For the purposes of the present discussion, a table displayed via a webpage or otherwise included in webpage markup is called a web-based table or a web-based data grid. A data grid may be any organization of data into one or more columns or rows and may include accompanying user interface controls, such as scroll bars, headers, Query By Example (QBE) elements, and so on, for adjusting data displayed in the one or more columns or rows. The terms "data grid" and "table" may be employed interchangeably herein. Note however, that data grids and tables are not limited to conventional HyperText Markup Language (HTML) tables specified via HTML table tags. For example, data grids and tables discussed herein may include dynamically generated structures and content.

For the purposes of the present discussion, dynamic content may be any content that includes output from a script. Content may be any resource, which may include data and/or functionality, such as a web page, file, streaming audio and/or video, and so on.

A script may be any computer program, or component, function, or procedure thereof adapted to perform one or more tasks. A content-producing script may be any script that is adapted to output content, such as a data grid. For example, a script (e.g., a JavaScript document.write( . . . ) script) that outputs content (e.g., markup) that includes one or more data grids, represents a type of content-producing script, also called a data grid generating script. Similarly, a script that includes one or more function calls to a content-producing script is also is considered to be a content-producing script.

Certain scripts may be executed via a browser, which may run on a computer (called a client computer) that is separate from a content server that hosts content that includes the script. Such a browser is called a client browser. A client browser may be any browser software running on a client computer or system. A browser may be any software adapted to access and/or traverse content available via a computer network, such as an enterprise network and/or the World Wide Web. A client may be any computer or system that is adapted to receive content from another computer or system, called a server. Page: 6

A server may be any computing resource, such as a computer and/or software that is adapted to provide content to another computing resource or entity that requests it, i.e., the client. A content server may be any server that is adapted to provide a resource, e.g., data or functionality, to a client.

For clarity, certain well-known components, such as hard drives, processors, operating systems, power supplies, Internet Service Providers (ISPs), and so on, have been omitted from the figures. However, those skilled in the art with access to the present teachings will know which components to implement and how to implement them to meet the needs of a given implementation.

FIG. 1 is a diagram illustrating a first example system 10 for accessing and displaying data in a web-based table with freeze functionality. For the purposes of the present discussion, freeze functionality may be any function or capability for fixing one or more elements of a table or data grid in response to a horizontal or vertical scrolling operation applied to the table or applied to another table (e.g., underlying table) that includes a superset of data or elements of the table or table portion (called the frozen section, frozen area, frozen portion, or frozen layer) to which freeze functionality is applied.

A frozen section of a table or data grid may be any portion of a table or data grid whose table elements thereof do not horizontally scroll in response to horizontal scrolling of the table. A frozen section of a table, as discussed herein, may represent a replica of a selected area of the table, where the replica is presented in a separate table from the first table, but wherein the separate table is overlaid over the underlying table from which an area was selected to be frozen.

More specifically, an area of a table is said to be horizontally frozen if data and/or elements therein do not horizontally scroll in response to horizontal scrolling of the table that contains a representation of the selected area. In addition, an area of a table that does not vertically scroll in response to vertical scrolling of the underlying table is also said to be vertically frozen. A table section that is horizontally frozen and/or vertically frozen is said to be frozen even if the table section does not remain static in response to vertical or horizontal scrolling, respectively, of the underlying table. Hence, even if a table section is not frozen in response to vertical scrolling, the table section is still considered frozen if the table section is horizontally frozen.

The example system 10 includes a client computer system 12 in communication with a content server 14 via a network 16, such as the Internet. The client 12 includes a browser, which includes a webpage retriever 20 that is adapted to selectively retrieve content 18, including table markup, from the content server 14. The content 18 includes scripts and/or expressions adapted for client-side execution to generate a table and accompanying frozen section.

The webpage retriever 20 communicates with a client-side markup handler 22, which includes a markup parser 24 for parsing HTML markup and accompanying scripts into a markup Document Object Model (DOM) 28. The example DOM 28 includes a table DOM structure 32 with one or more DIV elements, such as a first DIV element 34. The first DIV element 34 acts as a container for encapsulating table data and scripts 36 in a computing object. A DIV element may be any computing object that is contained within one or more HTML DIV tags included in HTML markup. The example DOM 28 further includes a frozen section DOM structure 38, with a second DIV element 40 and accompanying data and scripts 42 for a frozen table section, as discussed more fully below.

Note that while the table DOM Structure 32 and frozen section DOM structure 38 are shown separately within the overall markup DOM, other arrangements are possible. For example, in certain implementations, the frozen section DOM structure 38 may be nested within the table DOM structure 32.

For the purposes of the present discussion, a table or table section is said to be encapsulated if markup used to generate the table is included in a computing object, such as a computing object specified via HTML DIV tags. A computing object may be any collection of data and/or functionality. An encapsulated table is said to be included in a container. When HTML DIV tags are used to encapsulate a table or table section, the container is called a DIV container.

The client 12 includes a rendering module 26 in communication with the DOM 28 and a browser graphical user interface 30. The rendering module includes scripts, as discussed more fully below, for accessing and/or modifying the DOM 28 and scripts thereof to facilitate rendering a table 44 with an accompanying frozen section 46. The frozen section 46 may be implemented as a second table that overlays the table 44 and includes a subset of data and structure thereof. User interface controls 48, such as scroll bars, QBE elements, and so on are adapted to facilitate scrolling or otherwise adjusting elements of the table 44.

The frozen section 46 may also be responsive to user input via the user interface controls 48. For example, in one example embodiment, in response to a vertical scroll operation, table elements of the frozen section 46 scroll vertically. However, in response to a horizontal scroll operation, table elements for the frozen section 46 remain fixed while table elements of the underlying table 44 horizontally scroll.

The rendering module 26, in communication with the DOM 28, is adapted to access one or more event handlers/listeners on the element nodes inside the DOM 28, to facilitate event-driven actions and adjustments to the browser user interface display 30 in response to user input from one or more user interface controls.

For the purposes of the present discussion, a table element may be any row, column, cell or collection thereof of a table. A table element may also refer to the data included a row, column, or cell of a table.

Page: 9
A layer may be any display element or associated computing object, contents of which are adapted to be displayed in a region of a display screen. A first table or table section is said to have a higher z-index than a second table or section if the second table or section is overlaid relative to the first table or section. A second section is said to be overlaid over a first section in a separate layer if the second section may obscure data in a first section that would ordinarily appear in an area covered by the second section. In the present example embodiment, the frozen section 46 represents a layer with a higher z-index than the underlying table 44, wherein the frozen section 46 is overlaid on the table 44.

The frozen section 46 is encapsulated in a DIV element 40, which is substantially similar in structure to the DIV element 34 of the underlying table 46, thereby ensuring consistency in look and feel between the frozen section 46 and the table 44.

Hence, in the present example embodiment, a table, also called a data grid, includes freeze functionality, whereby portions of fixed data can be prevented from scrolling off-screen in response to a horizontal scroll operation even while the overall page or table in which the fixed data resides or overlays is being horizontally scrolled off of the screen. It is desirable to provide this "freeze functionality" in cases where the data is being displayed from within a network page or webpage such as, for example, an HTML webpage.

FIG. 2 is a diagram illustrating a first example table 44 with a highlighted horizontally frozen section 46 before scrolling. Frozen sections, such as the frozen section 46, can be selected or defined by any means as is known in the art such as by employing a mouse 78 or other pointing device to click and drag a bounding box. Any number of frozen sections may be defined. In other embodiments, the frozen sections need not be rectangles but can assume any desired shape. Three dimensional viewing applications can similarly use three-dimensional areas such as cubes, boxes, spheres, etc.

An upper portion of the frozen section 46 includes a header with various example QBE elements 66 and column titles 68. Below the header elements 66, 68, are table elements 70, which include various table rows and columns. In the present example embodiment, the columns of the frozen section 46 are frozen, e.g., in response to user manipulation of a horizontal scroll bar 78, whereas the rows may vertically scroll, e.g., in response to user manipulation of a vertical scroll bar 82.

The left most portion of the frozen section 46 includes various vertically arranged check boxes and fields, followed by various columns, including an "Order Number" column and a "Sold To" column, and columns therebetween. An underlying table section 62, which is encapsulated in a separate DIV container than the frozen section 46, also includes a header with various QBE elements 72 and column titles 74.

A "Description" column 84 of an underlying table 62, called the non-frozen section, is labeled for reference. In general, portions of the non-frozen section 62 are viewable (in a so-called "non-frozen area") to the right of the frozen section 46 and include the columns "Sold To Name," "Quantity," "Description 1," "UOM," "Extended Amount," "Ship To," and "Last Status." Other columns in the non-frozen section 62 are off to the right side of the display screen and are not yet in view. An additional portion and accompanying columns of the non-frozen section 62 are hidden beneath the frozen section 46. Prior to scrolling operations, the frozen section 46 represents a replica of the portion of the non-frozen section 62 hidden by or overlaid via the frozen section 46.

An example horizontal scroll operation, as discussed more fully below with reference to FIG. 3, will cause columns of underlying table section 62 and accompanying table elements 76 thereof to shift. For example, a user may employ the mouse 78 to move a horizontal scroll bar 80 to the right, thereby causing the description column 84 to shift to the left toward the frozen section 46, while the frozen section table elements 70 remain fixed.

In a preferred embodiment, the frozen section 46 is always "on top" of the non-frozen data 76 of the non-frozen section 62. It can also be described as having a higher "z index" or to be "overlaying" the non-frozen data 76. Different ways of achieving this effect within a webpage are possible. Particular example embodiments are described herein and in example source code accompanying the above-identified U.S. Provisional Patent Application Ser. No. 61/541,895, which is incorporated in full herein by reference. The source code describes a preferred embodiment, where contents and structures specified in a DIV tag defining a division element encapsulating the frozen section 46 are placed on top of the original table 62.

With reference to FIGS. 1 and 2, the division element 40 of the frozen section 46, also called DIV container, has a higher z-index than a related division element 34 of the original table 62. This ensures that the frozen section 46 will remain visible on top of the original table 62. The frozen section 46 area delimited by the DIV tag defining the frozen section DIV element 40 of FIG. 1 is updated with the data for the frozen area 46 of the data table 44. Note that in other embodiments other ways to code this functionality may be possible, without departing from the scope of the present teachings.

The data construction for the original grid, i.e., underlying table 62, and frozen section 46 can be done in such a way that, the same or similar DOM structure is created for the frozen section 46 and the original grid 62. This ensures that the frozen section 46 and the original grid 62 are consistent in appearance. In other embodiments, the structure of the DIV container 40 for the frozen section 46 might vary from that of the table DOM 32 for the non-frozen section 62.

FIG. 3 is a diagram illustrating the example table 44 of FIG. 2 after an example horizontal scroll operation. Note that while the table 44 is referred to as a single table, in practice the table 44 may comprise plural tables or data grids, including an underlying table corresponding to the frozen section 62, and an overlaid higher z-index table corresponding to the frozen section 46.

In FIG. 3, a user has moved the horizontal scroll bar 80 to the right via the mouse 78, such that the description column 84 now abuts a right-most edge of the frozen section 46. Note that the frozen section table elements 70 remain fixed in response to the horizontal scroll operation.

Hence, FIG. 3 shows the effect of the user scrolling the non-frozen area 62 to the right (which shifts elements thereof to the left) by moving the horizontal scroll bar 80 at the bottom of the view to the right. In FIG. 3, the position of and contents of the frozen area 46 have not changed. However, the two left-most rows of the non-frozen area 62, namely "Sold To Name" and "Quantity", are no longer visible. Instead, column "Description 1" 84 in the non-frozen area is now adjacent to the frozen area 46. Also, the columns "Next Status" and "Customer PO" are now in view in the non-frozen area 62. Thus, the frozen area 46 remains fixed or persistent within the view while the non-frozen area 62 is scrolled.

Although not illustrated, in an alternative implementation, vertical scrolling may behave similarly, whereby the non-frozen area 62 is scrolled vertically but the frozen area 46 and elements 70 thereof remain static, i.e., fixed in place. However, in a preferred implementation, vertical scrolling in response to user manipulation of the vertical scroll bar 82 causes vertical scrolling of elements 70 of the frozen section 46, while the header sections 66, 68 remain fixed.

Hence, a method adapted for use with the table 44 may include adapting one or more table elements 70 of the frozen section 46 to remain fixed in response to a horizontal scroll operation, and adapting one or more elements 70 of the non-frozen section 62 to change in response to a horizontal scroll operation.

Figure 4:
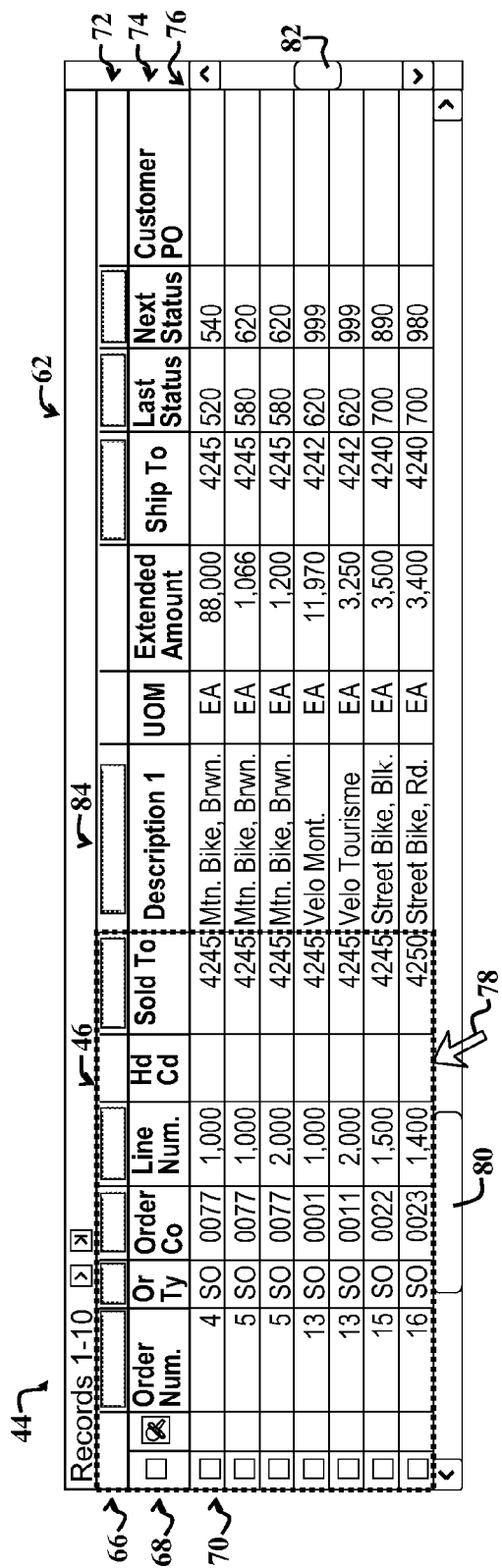
FIG. 4 is a diagram illustrating the example table of FIG. 3 after an example vertical scroll operation.

FIG. 4 is a diagram illustrating the example table 44 of FIG. 3 after an example vertical scroll operation. Note that various elements 70 of the frozen section 46 have been adjusted, in addition to elements 76 of the non-frozen section 62, in response to a vertical scroll.

In the present example embodiment, a downward vertical scroll has been implemented (thereby shifting table elements 70, 76 upward), e.g., in response to a user dragging the vertical scroll bar 82 downward. In response to a downward vertical scroll, one or more uppermost rows of the elements 70 are deleted; one or more lowermost rows are added to reveal additional data from the table 44; and rows therebetween are repositioned within the frozen area 46 to account for the addition and removal of other rows. Similar row deletions and additions are performed on the non-frozen section 62 in response to a downward vertical scroll operation.

Hence, a method adapted for use with the table 44 may include redrawing the frozen section 46 in response to a vertical scroll operation, wherein redrawing includes deleting one or more rows from a top portion of the frozen section 46 and adding one or more rows to a bottom portion of the frozen section 46 in response to a downward scroll operation.

Similarly, for an upward vertical scroll operation, an example method includes redrawing the frozen section 46, wherein redrawing includes deleting one or more rows from a bottom portion of the frozen section and adding one or more rows to a top portion of the frozen section.

With reference to FIGS. 1 and 4, the frozen area DIV container 40 has an overflow parameter set to hidden, and includes a specification that the frozen section 46 is to be sized (in accordance with user selected sizing input) to accommodate grid rows and columns that are frozen so that the frozen elements 70 appear on top of the data portion 76 of the underlying data grid 62, i.e., table 62. In response to a vertical scrolling of the original data grid 62, the data 70 in the frozen section 46 is scrolled programmatically to sync with the underlying data grid 62. Alternatively, the frozen section elements 70 remain fixed in response to vertical scrolling of the underlying data grid 62.

Figure 5:
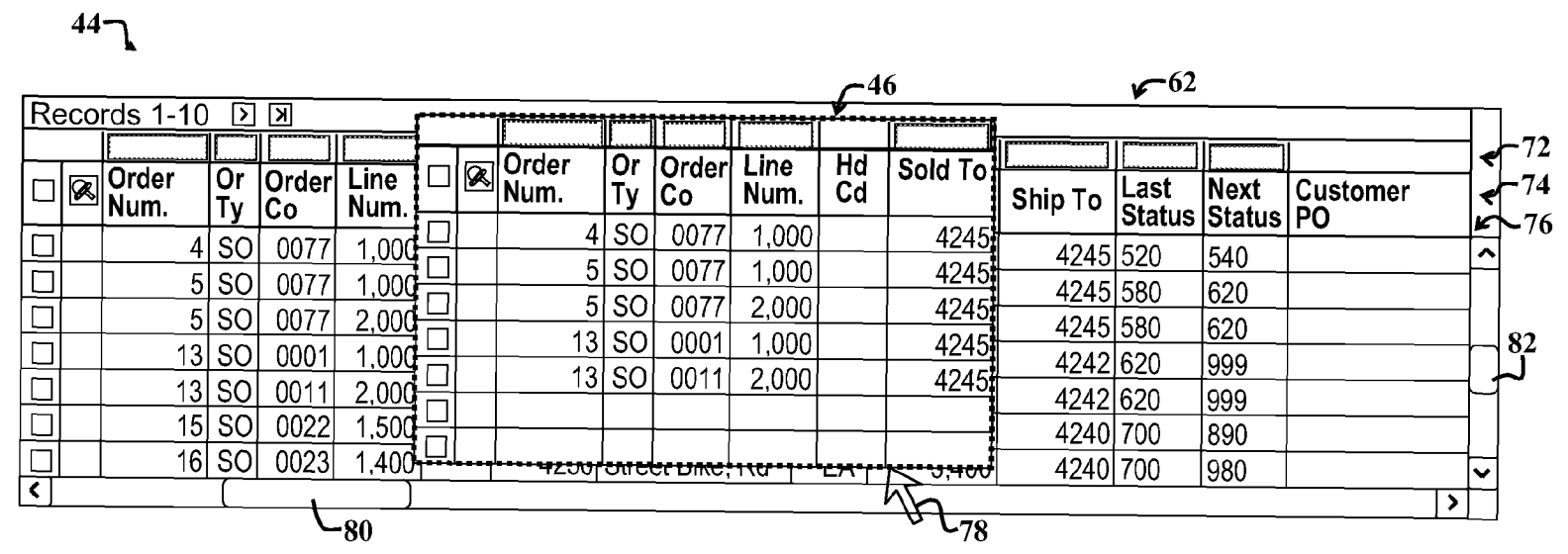

FIG. 5 is a diagram illustrating the example table 44 of FIG. 4, wherein the frozen section 46 has been displaced from its original position. Note that functionality for repositioning the frozen section 46, as discussed below with reference to FIG. 5, is optional and may be omitted, without departing from the scope of the present teachings.

Listeners included in the rendering module 26 and/or DOM 28 of FIG. 1 may include computer code for determining when a user has employed the mouse 78 to reposition the frozen section 46. Detection of such an event triggers redrawing of the underlying table section 62 and accompanying frozen section 78 to facilitate repositioning of the frozen section 46 relative to the underlying section 62.

The exact sequence of mouse movements or control inputs for enabling repositioning the grid 78 are implementation specific and may vary. In one possible implementation, after a user highlights the frozen section 46, a right-click drop-down menu is provided with a user option to detach the frozen section 46, after which it can be selected and moved via the mouse 78. Alternatively, such functionality may be incorporated into a right-click and hold operation, whereby a user employs a right mouse click to drag the frozen section 46. Functionality for repositioning the frozen section 46 may be omitted without departing from the scope of the present teachings.

Figure 6:
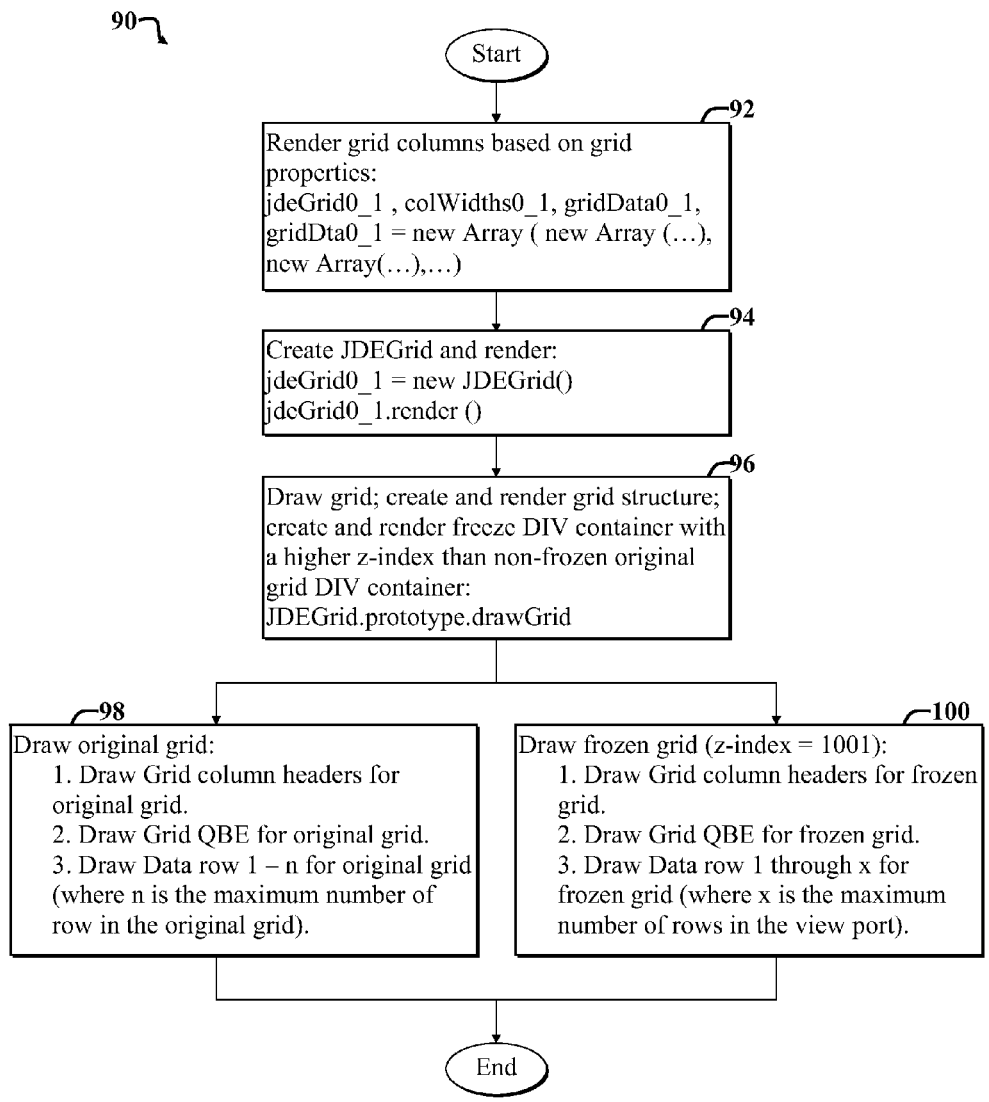
FIG. 6 is a flow diagram of a first example method for facilitating rendering a table with a frozen section for use by the embodiments of FIGS. 1-5.

FIG. 6 is a flow diagram of a first example method 90 for facilitating rendering a table with a frozen section for use by the embodiments of FIGS. 1-5. With reference to FIGS. 1-6, the example method 90 includes running various client-side scripts via the client markup handler 22 of FIG. 1, which have been retrieved from the content 18 from the content server 14.

A first column-rendering step 92 includes running various client-side scripts and/or accompanying functions to generate dynamic content, including columns and properties of the underlying non-frozen table 62, i.e., underlying data grid 62. The JavaScript client-side scripts (called JavaScripts) include computer code for using values and properties sent form the content server 14 to generate HTML markup for the data grid 62.

The content server 14 of FIG. 1 sends a two dimensional array with values in each cell of the grid 62. Multiple arrays, with width of columns, header titles, and so on, are sent from the content server 14 to be consumed by the JavaScripts and accompanying functions. The JavaScripts append HTML created thereby into the DOM 28 in a DIV container 34 detailed by the markup content 18 from the content server 14. Alternatively, the JavaScripts are run server-side, i.e., on the content server 14.

A second grid-rendering step 94 includes generating a new computing object called JDEGrid, which is set with properties detailed via the content 18. The render function, which is responsible for rendering the data grid 62, is called, which then constructs HTML markup for the data grid 62 and appends to the DIV container 34 of FIG. 1.

Note that the data grid 62 is not a conventional static HTML table defined via HTML table tags. Instead, the data grid 62 may be a more complex structure with plural tables and DIV elements (also called containers or computing objects) nested therein.

Subsequently, an underlying grid drawing step 98 and a frozen grid drawing step 100 may be completed in parallel to draw the underlying grid 62, i.e., non-frozen section 62, and to draw the frozen grid 46, i.e., frozen section 46, respectively.

The underlying grid drawing step 98 includes running a JavaScript render function, which calls multiple functions to construct the HTML markup for the underlying data grid 62. When rendering the underlying data grid 62, the gird structure is first created, and then each row is rendered and appended to the DOM 32 of FIG. 1.

Generally, two tables are employed, including one table for the underlying data grid 62, also called the original grid (including the grid headers 72, 74 and grid elements 76), and a second table for the frozen grid 46. Additional elements may be employed to obtain the final look and feel of the table 44.

The underlying grid drawing step 98 includes calling a DrawGrid JavaScript function to draw column headers for the underlying grid 62; calling DrawGrid to draw QBE elements for the underlying grid 62; and calling a DrawData JavaScript function to populate the grid elements 76 of the underlying grid 62.

The original grid column header 74 may be implemented as an HTML Table Row (TR) that contains all the header cells (for the corresponding columns). Similarly, the column QBE section 72 may be implemented as a separate TR that contains all the QBE cells for the corresponding columns.

The frozen grid drawing step 100 includes calling the DrawGrid JavaScript function to draw column headers 68 for the frozen section 46; calling DrawGrid to draw the QBE section 66 of the frozen section 46; and calling a DrawData JavaScript function to populate grid elements 70 of the frozen section 46. Note that the column header 68 and QBE section 66 of the frozen section 46 are implemented as separate TRs (similar to the original grid 62 column header 74 and QBE section 72), with the exception that the number of cells and columns inside the frozen grid 46 are limited to the number of frozen cells and columns.

Figure 7:
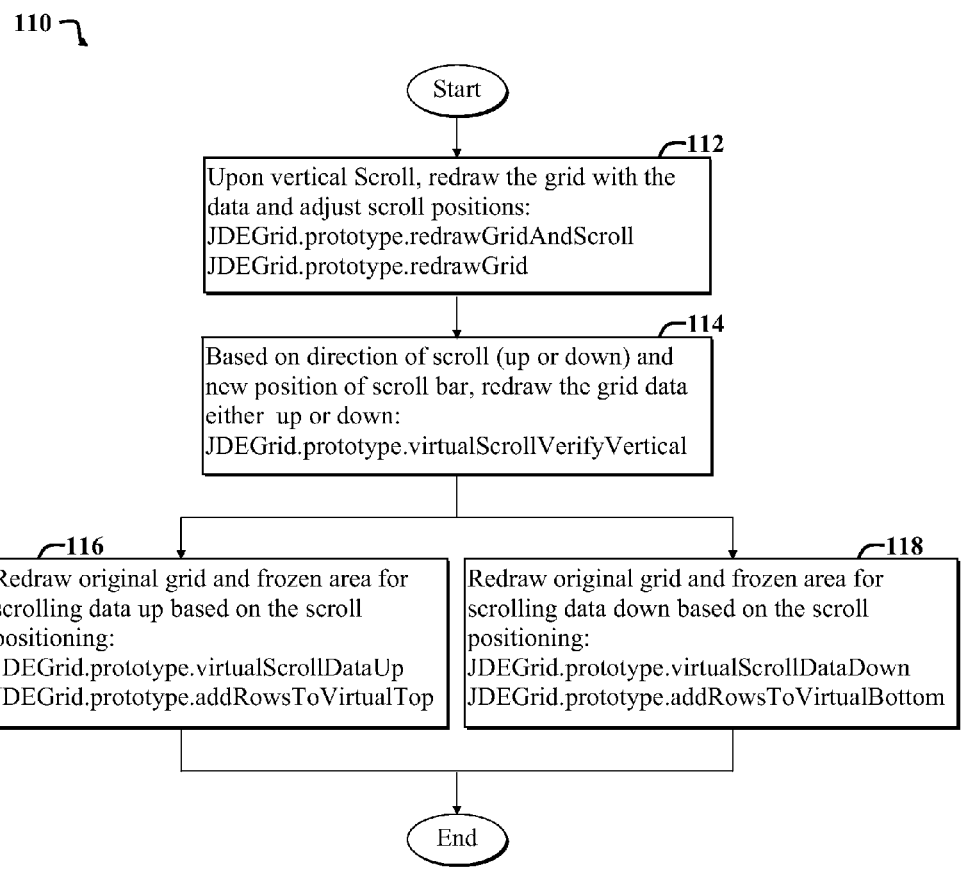
FIG. 7 is a flow diagram of a second example method adapted for use with the embodiments of FIGS. 1-5 for facilitating rendering display of a table and accompanying frozen section in response to a vertical scroll operation.

FIG. 7 is a flow diagram of a second example method 110 adapted for use with the embodiments of FIGS. 1-5 for facilitating rendering display of a table 44 and accompanying frozen section 46 in response to a vertical scroll operation. The example method includes an initial redrawing step 112, which is activated in response to a vertical scroll, e.g., as initiated by a user employing the mouse 78 to adjust the vertical scroll bar 82 of FIGS. 2-5.

With reference to FIGS. 1-7, the initial redrawing step 112 includes detecting a vertical scroll event/operation and redrawing the data grid 44 and accompanying vertical scroll bar 82 in accordance with the scroll operation to facilitate adjusting scroll position of the scroll bar 82 and to facilitate making any requisite adjustments to the structure of the table 44. The initial redrawing step 112 may include calling various JavaScript functions, such as JDEGrid.prototype.redrawGridAndScroll, and HDEGrid.prototype.redrawGrid to facilitate adjusting the data grid by re-drawing it based on the scroll position, which can be either up or down.

A second scroll direction verifying step 114 may call certain JavaScript functions, such as JDEGrid.prototype.virtualScrillVerifyVertical to confirm whether a downward or upward vertical scroll has been initiated.

In the event of an upward vertical scroll, an upward scrolling step 116 is performed. Otherwise, in the event of a downward vertical scroll, a downward scrolling step 118 is performed.

The upward scrolling step 116 includes redrawing the original data grid 62 and frozen section 46 based on the position of the scroll bar 82 by calling various JavaScript functions, such as JDEGrid.prototype.virtualScrollDataUP and JDEGridprototype.addRowsToVirtualTop.

Similarly, the downward scrolling step 118 includes redrawing the original data grid 62 and frozen section 46 based on the position of the scroll bar 82 by calling various JavaScript functions, such as JDEGrid.prototype.virtualScrollDataDown and JDEGrid.prototype.addRowsToVirtualBottom.

Hence, in general, during vertical scrolling if rows are to be rendered need to be rendered at the top of a data grid, such as in response to upward scrolling, the JavaScript function "virtualScrollDataUp" is called, which determines how many rows need to be filled or added with available data based on the position of the scroll bar 82. After determining the number of rows to be added, the JavaScript function "addRowsToVirtualTop" is called to construct, draw, and insert the corresponding data rows into the existing grid data table.

The JavaScript functions may include loops, which are iterated to determine which rows need to be constructed and drawn and to call necessary functions to construct and draw the rows. Note that when rows are added, a similar number of rows on the opposite side (e.g., top side during a downward vertical scroll) of the grid sections 46, 62 are removed.

Whenever a new row is constructed and added during the scrolling process, a similar corresponding row for the frozen grid 46 is constructed and added to the frozen section 46. The constructed row for the frozen grid 46 is inserted (if not already present) into the existing frozen grid 46 at an appropriate position/index. In addition, in certain specific implementations, the height of the frozen grid 46, e.g., as specified via the DIV container 40 of FIG. 1, may be adjusted if it does not match the height of the original data grid 62.

Similarly, in response to a downward scroll, after adding the required number of rows at the top of the data grid sections 46, 62 (if needed based on the bottom row position), some rows may be deleted from the bottom part of the data grids 46, 62, so that they are no longer visible after the downward vertical scroll.

During vertical scrolling if the total height (row count) of the visible rows of the frozen section 46 and/or underlying section 62 is less than the height of the original grid 62 before scrolling, then the required number of rows (to ensure the data grid heights remain unchanged) is added at the bottom of the frozen grid 46 and/or at the bottom of the underlying grid 62 as needed (in response to downward vertical scrolling). Addition of rows to the data grids 46, 62 may be implemented by calling an "addRowsToVirtualBottom" JavaScript function. This function behaves similarly to the "addRowsToVirtualTop" JavaScript function, with the exception that the new rows are constructed and added, i.e., inserted, at the bottom (instead of the top) of the data grid sections 46, 62.

Whenever a new row is constructed and added to the underlying grid 62 during vertical scrolling, a similar row is constructed and added, i.e., inserted to the frozen data grid 46 at a corresponding place/index. In addition, the height (row count) of the frozen grid Div container 40 of FIG. 1 is adjusted as needed to match the height of the frozen section 46 and/or original underlying grid 62 existing before the scrolling operation. Rows are added at the bottom and/or top of the frozen section 46 and underlying section 62 in accordance with a downward vertical or upward vertical scroll, while a corresponding number of rows are removed from the top and/or bottom, respectively of the frozen section 46 and underlying section 62.

Figure 8:
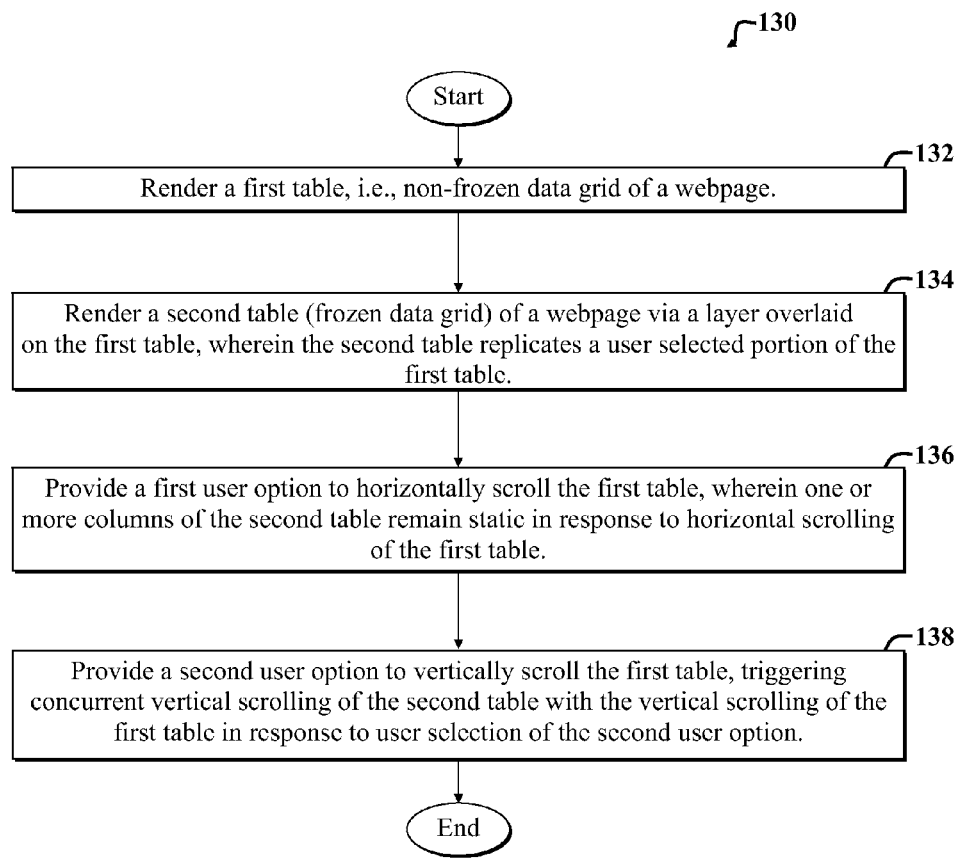
FIG. 8 is a flow diagram of a second example method, which is adapted for use with the embodiments of FIGS. 1-7.

FIG. 8 is a flow diagram of a second example method 130, which is adapted for use with the embodiments of FIGS. 1-7. The second example method 130 includes a first step 132, which involves rendering a first table, such as the underlying table 62 of FIGS. 2-5.

A second step 134 includes rendering a second table, such as the frozen section 46 of FIGS. 2-5, via a layer overlaid on the first table, wherein the second table replicates a user selected portion of the first table.

A third step 136 includes providing a first user option to horizontally scroll the first table, wherein one or more columns of the second table remain static in response to horizontal scrolling of the first table.

A fourth step 138 includes providing a second user option to vertically scroll the first table, which concurrently vertically scrolls the second table with the vertical scrolling of the first table, in response to user selection of the second user option.

Note that various steps of the method 130 may be augmented, replaced, or interchanged without departing from the scope of the present teachings. For example, an alternative or additional method includes maintaining a fixed display portion corresponding to the second table while a non-fixed display portion, corresponding to the first table, is being scrolled by accepting a signal from a user input device to select a frozen area of a table display; determining a non-frozen area of the table display; accepting a signal from a user input device to indicate a horizontal scrolling of data in the table display; and changing the non-frozen area of the table display in accordance with the horizontal scrolling of data while not changing the frozen area of the table display.

Additional example steps may include accepting a signal from a user input device to indicate a vertical scrolling of data in the table display, and changing the non-frozen area and the frozen area of the table display in accordance with the vertical scrolling of data. The webpage may include HTML, and a DIV tag may be employed to define a DIV element or container that includes at least a portion of the frozen area or data corresponding thereto. The method may further include ensuring that the frozen area has a higher z-index than the non-frozen area.

A further understanding of the nature and the advantages of particular embodiments disclosed herein may be realized by reference to the source code provided with the above-identified U.S. Provisional patent application from which the present application claims priority, and which is incorporated by reference herein. Below are summary descriptions of portions of the source code:

1. Frozen area DIV is created and added to the DOM via code that includes: JSGrid.js-DrawGrid( ). The freeze DIV (e.g., 40 of FIG. 1) is created via code that includes: var freezeDiv=document.createElement('div'). The freeze DIV is added to GridStructure DIVs via code that includes: gridStructureDivs[0].parent and Node.appendChild(freezeDiv).

2. During Vertical scrolling of grid, data is synced between the frozen 46 and non-frozen section 62 via code that includes: JSGrid.js-addRowsToVirtualTop( ), JSGrid.js-addRowsToVirtualBottom( ), and JSGrid.js-virtualScrollRender( ). Here the ScrollTop position is adjusted accordingly when no rows are added to the frozen DIV during vertical scroll.

Although the description has been described with respect to particular embodiments thereof, these particular embodiments are merely illustrative, and not restrictive. For example, although particular embodiments relate specifically to viewing data tables in a web page, some features described herein may be adaptable to other types of data display such as in software applications or in various other structures in any suitable type of electronic document.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for displaying data in a table of a webpage, the method comprising:
   employing a client browser to render a first table;
   using the client browser to render a second table via a layer overlaid on the first table, wherein the second table replicates a corresponding user selected portion of the first table;
   positioning the second table over the replicated user selected portion of the first table such that a graphical combination of the first table and the second table generates a visual representation of the first table including both the user selected portion and an unselected portion thereof;
   linking vertical scrolling of the first table to the second table such that first table and the second table scroll together in a vertical direction; and establishing independent horizontal scrolling between the first table and the second table such that one or more columns of the second table remain static in response to scrolling the first table in a horizontal direction.

2. The method of claim 1, further including providing a first user option to horizontally scroll the first table.

3. The method of claim 1, further including providing a second user option to vertically scroll the first table, concurrently vertically scrolling the second table with the vertically scrolling of the first table in response to user selection of the second user option.

4. The method of claim 1, further including providing a third user option to reposition the second table relative to the first table.

5. The method of claim 1, wherein the second table represents a user selected frozen section of the first table, wherein data contained in the second table remains static in response to horizontal scrolling of the first table.

6. The method of claim 5, further including employing JavaScript to generate the first table and the frozen section.

7. The method of claim 6, further including transferring JavaScript from a server to a client; and executing the JavaScript via a browser running on the client.

8. The method of claim 5, further including employing one or more HyperText Markup Language (HTML) DIV tags to encapsulate the first table in a first Document Object Model (DOM) structure.

9. The method of claim 8, further including using one or more HTML DIV tags to encapsulate the frozen section in the DOM structure, resulting in an encapsulated frozen section with a higher z-index than the first table.

10. The method of claim 9, wherein the encapsulated frozen section includes a similar table structure as the first table with the exception that a number of vertical columns of the frozen section remains fixed and determined by user selection of an area of the first table to be frozen.

11. The method of claim 10, further including adapting one or more table elements of the frozen section to remain fixed in response to a horizontal scroll operation, and adapting one or more elements of the first table to change in response to a horizontal scroll operation.

12. The method of claim 11, further including redrawing the frozen section in response to a vertical scroll operation.

13. The method of claim 12, wherein redrawing includes deleting one or more rows from a top portion of the frozen section and adding one or more rows to a bottom portion of the frozen section in response to a downward scroll operation.

14. The method of claim 12, wherein redrawing includes deleting one or more rows from a bottom portion of the frozen section and adding one or more rows to a top portion of the frozen section in response to an upward scroll.

15. The method of claim 1, wherein the method further includes maintaining a fixed display portion corresponding to the second table while a non-fixed display portion corresponding to the first table is being scrolled by performing the following steps:
  accepting a signal from a user input device to select a frozen area of a table display;
  determining a non-frozen area of the table display;
  accepting a signal from a user input device to indicate a horizontal scrolling of data in the table display; and
  changing the non-frozen area of the table display in accordance with the horizontal scrolling of data while not changing the frozen area of the table display.

16. The method of claim 15, further including accepting a signal from a user input device to indicate a vertical scrolling of data in the table display, and changing the non-frozen area and the frozen area of the table display in accordance with the vertical scrolling of data.

17. The method of claim 16, wherein the webpage includes hypertext markup language (HTML).

18. The method of claim 16, further including using a DIV tag to define a DIV element that includes at least a portion of the frozen area, and ensuring that the frozen area has a higher z-index than the non-frozen area.

19. An apparatus comprising:
  a digital processor coupled to a display and to a processor-readable storage device, wherein the processor-readable storage device includes one or more instructions executable by the digital processor to perform the following acts:
  employing a client browser to render a first table;
  using the client browser to render a second table via a layer overlaid on the first table, wherein the second table replicates a corresponding user selected portion of the first table;
  positioning the second table over the replicated user selected portion of the first table such that a graphical combination of the first table and the second table generates a visual representation of the first table including both the user selected portion and an unselected portion thereof;
  linking vertical scrolling of the first table to the second table such that first table and the second table scroll together in a vertical direction; and
  establishing independent horizontal scrolling between the first table and the second table such that one or more columns of the second table remain static in response to scrolling the first table in a horizontal direction.

20. A non-transitory computer readable medium including instructions executable by a digital processor, the computer readable medium including one or more instructions for:
  employing a client browser to render a first table;
  using the client browser to render a second table via a layer overlaid on the first table, wherein the second table replicates a corresponding user selected portion of the first table;
  positioning the second table over the replicated user selected portion of the first table such that a graphical combination of the first table and the second table generates a visual representation of the first table including both the user selected portion and an unselected portion thereof;
  linking vertical scrolling of the first table to the second table such that first table and the second table scroll together in a vertical direction; and
  establishing independent horizontal scrolling between the first table and the second table such that one or more columns of the second table remain static in response to scrolling the first table in a horizontal direction.

* * * * *